United States Patent [19]

Imoto et al.

[11] Patent Number: 6,066,414
[45] Date of Patent: May 23, 2000

[54] MATERIAL OF NEGATIVE ELECTRODE AND NONAQUEOUS-ELECTROLYTE SECONDARY BATTERY USING THE SAME

[75] Inventors: Hiroshi Imoto; Shinichiro Yamada, both of Kanagawa, Japan

[73] Assignee: Sony Corporation, Tokyo, Japan

[21] Appl. No.: 09/123,996

[22] Filed: Jul. 29, 1998

[30] Foreign Application Priority Data

Jul. 29, 1997 [JP] Japan .................................. 9-203495

[51] Int. Cl.$^7$ ............................ H01M 4/48; C01G 17/02
[52] U.S. Cl. ..................... 429/218.1; 429/231.1; 429/231.6; 429/231.9; 423/618; 423/600
[58] Field of Search ........................... 429/218.1, 231.1, 429/231.6, 231.9; 423/600, 618, 325, 326, 327.1, 332

[56] References Cited

U.S. PATENT DOCUMENTS 4,069,058  1/1978  Washburn .................................. 106/55

OTHER PUBLICATIONS

Podsiadlo, S., Formation and Thermal Decomposition of Germanium Nitroxy Compounds, J. Therm. Anal., 34 (4), 983–7, 1988.

*Primary Examiner*—Maria Nuzzolillo
*Assistant Examiner*—Angelo J. Martin
*Attorney, Agent, or Firm*—Hill & Simpson

[57] ABSTRACT

A material for a negative electrode having excellent performance for doping lithium and de-doping lithium and a nonaqueous-electrolyte secondary battery having a large capacity are provided. The nonaqueous-electrolyte secondary battery is disclosed which has a negative electrode mainly composed of a compound containing at least any one of silicon, germanium and tin, nitrogen and oxygen, a positive electrode made of composite metal oxide containing lithium or an interlayer compound containing lithium and nonaqueous electrolyte.

11 Claims, 2 Drawing Sheets

MATERIAL OF NEGATIVE ELECTRODE AND NONAQUEOUS-ELECTROLYTE SECONDARY BATTERY USING THE SAME

BACKGROUND OF THE INVENTION

1. Field of the Invention

The present invention relates to a material of a negative electrode which can be doped/de-doped with lithium and a non-aqueous-electrolyte secondary battery.

2. Description of the Related Art

Since electronic technology has progressed in recent years, electronic apparatuses having small sizes have been developed, which include camcoders, portable telephones, laptop computers and so forth. As a portable power source for operating the above-mentioned apparatus, development of a secondary battery exhibiting a small size and light weight and having a high energy density has earnestly been requested.

As a secondary battery which is capable of meeting the above-mentioned request, nonaqueous-electrolyte secondary batteries have been expected. The nonaqueous-electrolyte secondary batteries contain light metal, such as lithium, sodium or aluminum, each of which is theoretically capable of generating high voltages and which have high energy densities, the light metal being contained to serve as a material for forming a negative electrode. Among the foregoing nonaqueous-electrolyte secondary batteries, the nonaqueous-electrolyte secondary battery containing lithium, which is employed to form the negative electrode, can easily be handled. Moreover, the foregoing nonaqueous-electrolyte secondary battery is able to realize a large output and a high energy density. Therefore, the nonaqueous-electrolyte secondary battery containing lithium has energetically be researched and developed.

When light metal, such as lithium, is as it is employed as the material for forming the negative electrode of the nonaqueous-electrolyte secondary battery, light metal in the form of dendrite can easily be deposited on the negative electrode. As a result, the density of electric currents is considerably raised at the leading ends of the dendrite. Therefore, there arises problems in that the cycle operation life is shortened because of decomposition of the nonaqueous electrolyte and internal short circuit of the battery takes place because the dendrite is excessively enlarged.

To prevent deposition of metal in the form of the dendrite, graphite materials of a type using intercalation reactions of lithium ions into graphite in place of simple use of the lithium to form the negative electrode have been employed. As an alternative to this, carbonaceous materials of a type using doping/de-doping lithium ions into pores have been employed.

However, the graphite material using the intercalation reaction involves a limit imposed on the capacity of the negative electrode as regulated by composition $C_6Li$ of the interlayer compounds between first-stage graphite layers. The carbonaceous material using doping/de-doping encounters industrial difficulty in controlling the fine pore structures. Moreover, the specific gravity of the carbonaceous material is undesirably lowered. Therefore, the carbonaceous material cannot effectively enlarge the capacity of the negative electrode per unit volume.

Because of the foregoing reasons, carbonaceous materials obtained at present are considered difficult to be adaptable to an operation of electronic apparatuses for longer time and rise in the energy density of the power source. Therefore, development of a material for the negative electrode having excellent performance for doping/de-doping lithium has been required.

SUMMARY OF THE INVENTION

In view of the foregoing, an object of the present invention is to overcome problems experienced with the conventional technology and to provide a material for a negative electrode having excellent performance of doping lithium and de-doping lithium and a nonaqueous-electrolyte secondary battery having a large capacity.

To achieve the foregoing object, the inventors of the present invention have energetically investigated the material for a negative electrode and the nonaqueous-electrolyte secondary battery. As a result, a compound composed of at least any one of silicon, germanium and tin, nitrogen and oxygen is a material for a negative electrode having excellent performance for doping lithium and de-doping lithium.

That is, according to one aspect of the present invention, there is provided a material for a negative electrode comprising: a compound containing at least any one of silicon, germanium and tin, nitrogen, and oxygen.

The compound is expressed by general formula MxNyOz (where M is an element selected from a group consisting of Si, Ge and Sn, x, y and z satisfy $1.4<x<2.1$, $1.4<y<2.1$ and $0.9<z<1.6$, respectively).

The compound is exemplified by $Si_2N_2O$, $Ge_2N_2O$ or $Sn_2N_2O$.

The compound may contain at least any one of elements selected from a group consisting of lithium, sodium, potassium, magnesium, calcium and aluminum.

In the compound composed of at least any one of silicon, germanium and tin; nitrogen; and oxygen, pseudo planes composed of chair-type six-membered rings each of which is composed of, for example, silicon and nitrogen are widened. Silicon-oxygen-silicon bonds exist to crosslink the planes to one another. The portions between the layers are considered to be formed into a one-dimensional tunnel shape as sites for doping/de-doping lithium. Therefore, the material for the negative electrode has superior performance for doping/de-doping to that of any of the conventional carbonaceous materials.

According to another aspect of the present invention, there is provided a nonaqueous-electrolyte secondary battery comprising: a negative electrode mainly made of a compound containing at least any one of silicon, germanium and tin, nitrogen, and oxygen; a positive electrode; and nonaqueous electrolyte.

The compound containing at least any one of silicon, germanium and tin, nitrogen, and oxygen is expressed by general formula MxNyOz (where M is an element selected from a group consisting of Si, Ge and Sn, x, y and z satisfy $1.4<x<2.1$, $1.4<y<2.1$ and $0.9<z<1.6$, respectively).

The compound for forming the negative electrode is exemplified by $Si_2N_2O$, $Ge_2N_2O$, and $Sn_2N_2O$.

The compound for forming the negative electrode may contain at least any one of elements selected from a group consisting of lithium, sodium, potassium, magnesium, calcium and aluminum. Thus, the conductivity of the material for a negative electrode can be improved.

It is preferable that at least one material selected from a group consisting of a carbonaceous material, metal powder and conductive polymer is contained in the material for a negative electrode as a conductive material.

Since the nonaqueous-electrolyte secondary battery according to the present invention incorporates the negative electrode having satisfactory doping/de-doping performance, the negative electrode is able to have a great capacity. When the negative electrode is combined with an appropriate positive electrode, a large capacity can be obtained.

Other and further objects, features and advantage of the invention will be appear more fully from the following description.

DESCRIPTION OF THE PREFERRED EMBODIMENT

Figure 1:
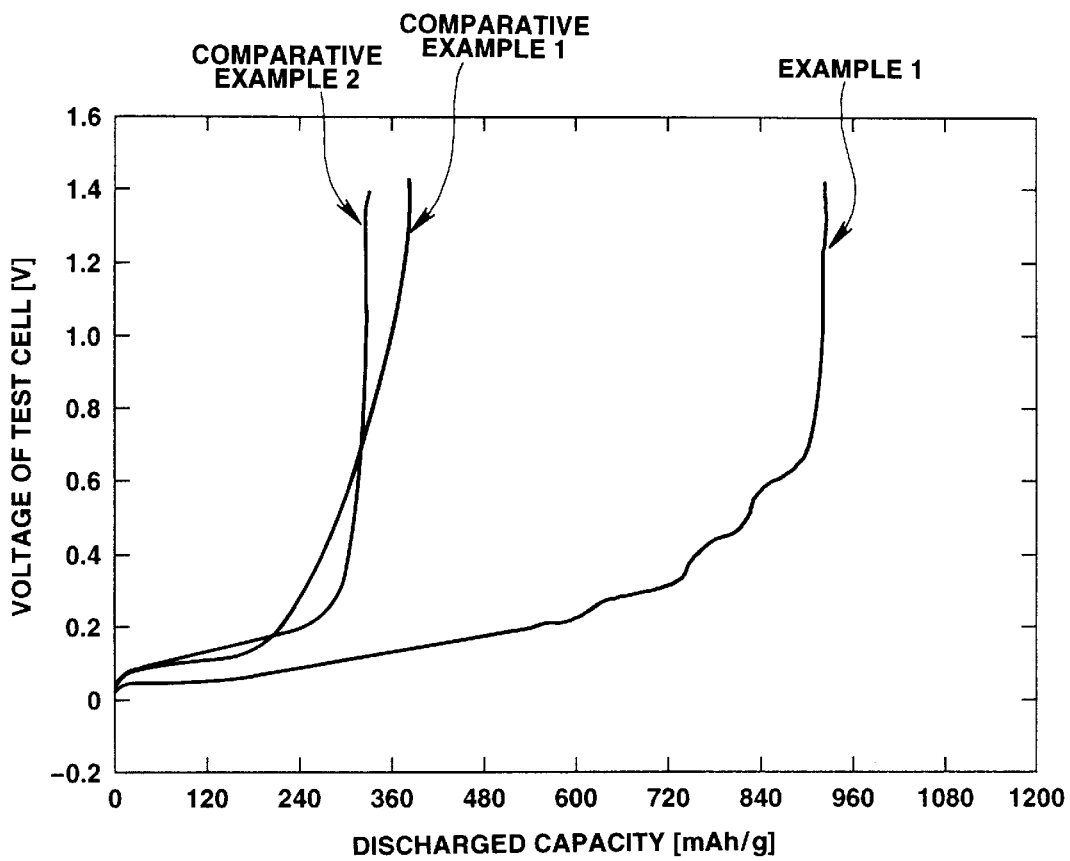
FIG. 1 is a graph showing a discharge curve of a material for a negative electrode according to the present invention.

A material for a negative electrode and a nonaqueous-electrolyte secondary battery according to the present invention will now be described.

The material of a negative electrode according to the present invention comprises a compound composed of at least any one of silicon, germanium and tin; nitrogen; and oxygen.

The compound is expressed by general formula MxNyOz (where M is an element selected from a group consisting of Si, Ge and Sn, x, y and z satisfy $1.4<x<2.1$, $1.4<y<2.1$ and $0.9<z<1.6$, respectively.

The foregoing compound is exemplified by $Si_2N_2O$, $Ge_2N_2O$ and $Sn_2N_2O$.

The foregoing compound may be added with alkali metal, such as lithium, sodium, calcium or aluminum or alkaline earth metal. For example, $Si_{2-x}Al_xN_{2-x}O_{1+x}$ may be employed in which Al is substituted for a portion of Si. When a univalent element or a bivalent elements is substituted for a portion of the quadrivalent element as described above, the conductivity can be improved.

In the compound composed of at least any one of silicon, germanium and tin; nitrogen; and oxygen, pseudo planes composed of chair-type six-membered rings each of which is composed of, for example, silicon and nitrogen are widened. Silicon-oxygen-silicon bonds exist to crosslink the planes to one another. The portions between the layers are considered to be formed into a one-dimensional tunnel shape as sites for doping/de-doping lithium. Therefore, the material for the negative electrode has superior performance for doping/de-doping to that of any of the conventional carbonaceous materials.

On the other hand, the nonaqueous-electrolyte secondary battery according to the present invention comprises a negative electrode mainly made of a compound composed of at least any one of silicon, germanium and tin; nitrogen; and oxygen; a positive electrode mainly composed of composite metal oxide containing lithium or interlayer compounds containing lithium; and nonaqueous electrolyte.

As described above, the compound serving as the material for the negative electrode is exemplified by $Si_2N_2O$, $Ge_2N_2O$ and $Sn_2N_2O$.

If the material for the negative electrode has no conductivity or poor conductivity, the conductivity may be improved by doping alkali metal, such as lithium, sodium, potassium, magnesium, calcium or aluminum, or alkali earth metal. For example, $Si_{2-x}Al_xN_{2-x}O_{1+x}$ may be employed in which Al is substituted for a portion of Si. Also a material obtained by substituting the other element for the foregoing portion may be employed as a satisfactory material.

When the negative electrode is manufactured from the foregoing material for the negative electrode, a carbonaceous material, metal powder having electric conductivity or a conductive polymer may be added as a conductive material together with a binder so as to maintain the conductivity of the material for the negative electrode. The binder may be any one of known materials.

As described above, the nonaqueous-electrolyte secondary battery according to the present invention incorporates the negative electrode mainly made of the compound composed of at least any one of silicon, germanium and tin; nitrogen; and oxygen, the negative electrode having great doping/de-doping performance. Therefore, the nonaqueous-electrolyte secondary battery containing the foregoing material for the negative electrode is able to raise the energy density per unit volume. As a result, a large capacity of the negative electrode can be obtained.

When the nonaqueous-electrolyte secondary battery is manufactured by the material for the negative electrode, it is preferable that the positive electrode contains lithium in a satisfactorily large quantity. For example, a lithium composite metal oxide expressed by general formula $Li_xMO_2$ (where M is at least any one of Co, Ni and Mn and $0<x<1$ is satisfied) or an interlayer compound containing lithium may be employed as a satisfactory material. If $LiCoO_2$ is employed, satisfactory characteristics can be obtained.

The lithium composite metal oxide can be prepared by pulverizing and mixing carbonate, nitrate, oxide or hydroxide of lithium and carbonate, nitrate, oxide or hydroxide of cobalt, manganese or nickel at a required composition ratio. Then, the mixture is baked at a temperature ranged from 600° C. to 1000° C.

Since the nonaqueous-electrolyte secondary battery according to the present invention is attempted to enlarge the capacity, the positive electrode must contain lithium in a quantity corresponding to a charge/discharge capacity of 250 mAh or greater for 1 g of the material for the negative electrode in a steady state (in a state after charge and discharge are repeated about five times). It is preferable that lithium is contained in a quantity corresponding to a charge/discharge capacity of 300 mAh or greater, more preferably lithium is contained in a quantity corresponding to a charge/discharge capacity of 350 mAh or greater. Note that lithium is not required to always be supplied from the material for the positive electrode. Lithium is required to exist in a quantity corresponding the charge/discharge capacity of 250 mAh or greater in the battery system. The quantity of lithium is determined by measuring the discharge capacity of the battery.

The nonaqueous electrolyte according to the present invention is prepared by arbitrarily combining an organic solvent and electrolyte. The organic solvent and the electrolyte may be usual materials for use in the battery of the foregoing type.

The organic solvent is exemplified by propylene carbonate, ethylene carbonate, diethyl carbonate, methylethyl carbonate, 1,2-dimethoxyethane, 1,2-diethoxyethane, γ-butyrolactone, tetrahydrofuran, 2-methyltetrahydrofuran, 1,3-dioxolane, 4-methyl-1,3-dioxolane, diethylether, sulfolane, methylsulfolane, acetonitrile, propylnitrile, anisole, acetic ester and propionic ester. Any one of the foregoing materials may be employed solely or their mixture may be employed.

The electrolyte may be lithium salt, such as $LiClO_4$, $LiAsF_6$, $LiPF_6$, $LiBF_4$, $LiB(C_6H_5)_4$, $LiCH_3SO_3$, $LiCF_3SO_3$, LiCl or LiBr.

EXAMPLES

Examples of the present invention will now be described such that results of experiments will be described.

Evaluation of Capacity of Negative Electrode

Example 1

Initially, amorphous $SiO_2$ (having an average particle size of about 10 μm) and Si (having an average particle size of about 1 μm) each of which was a reagent were weighed in such a manner that a molar ratio of 1:3 was realized. Then, the reagents were mixed in an agate mortar. The obtained mixture was introduced into an alumina boat, and then subjected to heat treatment in a tubular electric furnace set to 1450° C. for 5 hours such that the flow rate of nitrogen was 5 litters/minute.

The obtained compound was pulverized in the agate mortar. Then, X-ray diffraction was performed. Since resulted value d (distance between planes) and relative strength substantially coincided with those disclosed in the documents, the obtained compound was identified to be $Si_2N_2O$.

Then, artificial graphite was mixed with $Si_2N_2O$ at a ratio that $Si_2N_2O$:graphite=2:1 so that samples were manufactured. The samples were dried at 120° C. for 2 hours in an atmosphere of argon gas. Then, polyvinylidene fluoride was added as a binder in a quantity of 10 wt % of the sample, and then dimethylformamide was, as a solvent, mixed. Then, the material was dried so that a mixture of the material for the negative electrode was prepared. Then, 37 mg mixture of the material for the negative electrode was molded into a pellet having a diameter of 15.5 mm together with nickel mesh which was a collector. Thus, a $Si_2N_2O$ electrode was manufactured.

Comparative Example 1

Petroleum pitch was oxidized so that a carbon precursor was prepared which was carbonized at 500° C. for 5 hours in an atmosphere of nitrogen. Then, the carbonized material was pulverized in a mill, and then the pulverized material was introduced into a crucible by about 10 g. Then, the pulverized material was baked in an electric furnace in which nitrogen was allowed to flow at a flow rate of 5 liters/minute. The pulverized material was, for one hour, baked at a temperature of 1100° C. realized at a temperature rise speed of 5° C./minutes. Then, the baked material was cooled, and then pulverized in a mortar so that the pulverized material was classified by a mesh so that the particle size was made to be 38 μm or smaller. Thus, samples were manufactured.

Then, the samples were dried at 120° C. for 2 hours in an atmosphere of argon gas, and then polyvinylidene fluoride was added as a binder in an equivalent quantity of 10 wt % of the sample, and then dimethylformamide was, as a solvent, mixed. Then, the material was dried so that a mixture of the material for the negative electrode was prepared. Then, 37 mg mixture of the material for the negative electrode was molded into a pellet having a diameter of 15.5 mm together with nickel mesh which was a collector. Thus, a carbon electrode was manufactured.

Comparative Example 2

A graphite electrode was manufactured similarly to Comparative Example 1 except for using artificial graphite.

Evaluation of Characteristics

A counter electrode made of lithium, a separator in the form of a porous film made of polypropylene, nonaqueous electrolyte prepared by dissolving $LiPF_6$ in mixture solvent of ethylene carbonate and diethyl carbonate mixed by the same quantities at a ratio of 1 mol/l were employed to be combined with each of the electrodes according to the examples and comparative examples. Thus, coin-type test cells (according to Example 1 and Comparative Examples 1 and 2) each having a diameter of 20 mm and a thickness of 2.5 mm were manufactured.

Each of the above-mentioned coin-type test cells was subjected to charging/discharging operations under the following conditions. Since the operation is performed to evaluate the performance for doping/de-doping lithium which is the material for the negative electrode, the process in which lithium is doped into the required material for the negative electrode, that is, the process in which the voltage of the test cell is lowered, is called "charging". On the other hand, a process of de-doped lithium, that is, the process in which the voltage of the test cell is raised, is called "discharging".

Charging: the test cell was charged with a constant electric current of 1 mA until the voltage of the test cell reached 0 V. After the voltage was reached 0 V, charging was performed such that the electric current was reduced in such a manner that the voltage of the cell was maintained at 0 V. When the value of the electric current was made to be smaller than 20 μA, the charging operation was completed.

Discharging: discharging was performed with a constant electric current of 0.5 mA. When the voltage of the cell was made to be higher than 1.5 V, discharging was completed. Then, the discharged capacity was measured.

Results are shown in Table 1 and FIG. 1.

TABLE 1

| | Discharged Capacity [mAh/g] | Charging/ Discharging Efficiency [%] |
|---|---|---|
| Example 1 | 930 | 81 |
| Comparative Example 1 | 385 | 77 |
| Comparative Example 2 | 313 | 70 |

As can be understood from the results shown in Table 1 and FIG. 1, the $Si_2N_2O$ electrode incorporates the negative electrode having a larger capacity as compared with the conventional carbon electrode according to the Comparative Example 1. Also the artificial graphite employed as the conductive material serves as the electrode because it dopes and de-dopes lithium. A fact can be understood that Example 1 in which the $Si_2N_2O$ electrode was employed results in that the negative electrode has a large capacity as compared with the conventional material for the negative electrode.

Therefore, it can be understood that the $Si_2N_2O$ electrode has excellent performance for doping lithium and de-doping lithium and incorporating the negative electrode having a larger capacity as compared with that realized by the conventional material for the negative electrode.

Evaluation of the Characteristics as Battery

Figure 2:
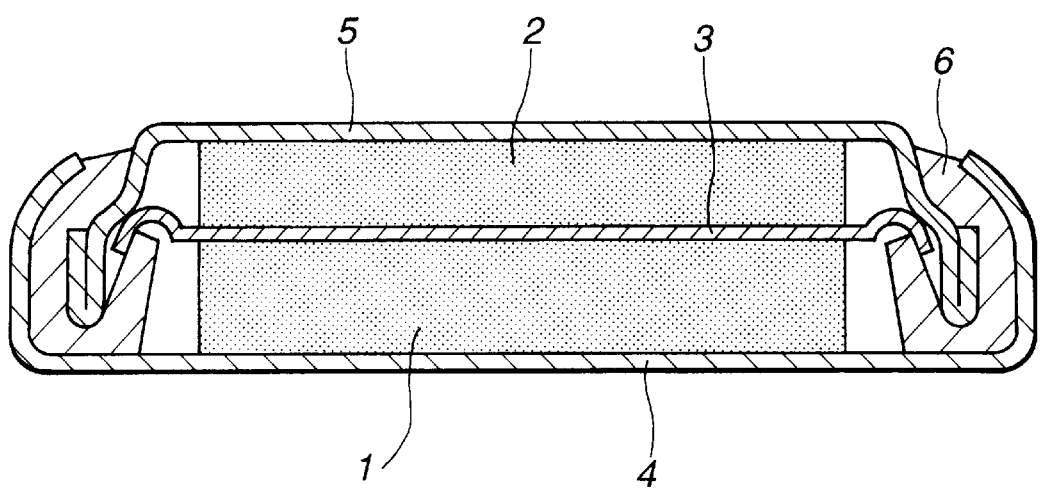
FIG. 2 is a cross sectional view showing the structure of a coin-type battery according to the present invention.

Coin-type batteries each having an outer diameter of 20 mm and a thickness of 2.5 mm and arranged as shown in FIG. 2 were manufactured as follows.

Example 2

Initially, positive-electrode pellet 1 was prepared as follows: $LiCoO_2$, artificial graphite serving as the conductive material and polyvinylidene fluoride serving as the battery were mixed with one another. Then, dimethylformamide was added as the solvent, and then the mixture was kneaded so that a slurry mixture was obtained. The mixture was dried, and then pulverized in an agate mortar so as to be pressurized and molded together with an aluminum mesh into the positive-electrode pellet 1.

A negative-electrode pellet 2 was the $Si_2N_2O$ electrode according to Example 1.

Then, the positive-electrode pellet 1 and the negative-electrode pellet 2 were accommodated in a positive-electrode can 4 and a negative-electrode cup 5. The positive-electrode pellet 1 and the negative-electrode pellet 2 were stacked through a separator 3, and the electrolyte was introduced. Then, a gasket 6 was used to caulk the body so that a coin-type battery was manufactured. The electrolyte was prepared by dissolving $LiPF_6$ in mixture solvent of ethylene carbonate and dimethyl carbonate at the same quantities, LiPF6 being dissolved at a ratio of 1 moles/liter.

Comparative Example 3

A coin-type electrode was manufactured similarly to Example 2 except for a structure that the negative-electrode pellet was a carbon electrode made of petroleum pitch prepared in Comparative Example 1.

Evaluation of Characteristics

Each of the coin-type batteries according to Examples 2 and Comparative Example 3 were electrically charged with a constant electric current of 0.5 mA until the voltage of the battery was made to be 3.7 V. After the coin-type batteries were allowed to stand for one hour, discharging was performed with a constant electric current of 0.5 mA until the voltage of each battery was made to be 2.5 V. Then, time required to complete discharging was measured. Results are shown in Table 2.

TABLE 2

|  | Duration of Discharging [Hours] |
| --- | --- |
| Example 2 | 70 |
| Comparative Example 3 | 29 |

As can be understood from results shown in Table 2, a fact was confirmed that the $Si_2N_2O$ electrode had longer duration of discharging a compared with the conventional carbon electrode in terms of the structure of the battery. Therefore, when a positive electrode for the $Si_2N_2O$ electrode is selected, a battery having a large capacity can be manufactured.

Example 3

$GeO_2$ which was a reagent and ammonia were allowed to react with each other at 870° C. in 500 ml/minute flow of argon gas containing ammonia so that $Ge_2N_2O$ was obtained. The obtained compound was pulverized in an agate mortar, and then X-ray diffraction measurement was performed. Since resulted value d of the peak of the diffraction and relative strength substantially coincided with those disclosed in the documents, the obtained compound was identified to be $Ge_2N_2O$. Then, the obtained material was molded into pellet similarly to Example 1 so that $Ge_2N_2O$ was manufactured.

Example 4

Amorphous $SiO_2$ (having an average particle size of about 10 μm) and Si (having an average particle size of about 1 μm) which were regents and $Al_2O_3$ (having an average particle size of about 3 μm) powder were weighed in such a manner that the molar ratio was made to be 23:69:4. Then, mixture and heat treatment were performed similarly to Example 1. The obtained compound was pulverized in an agate mortar, and then X-ray diffraction was performed. Since realized value d of the peak in the diffraction and the relative strength coincided with those disclosed in the documents, the compound was identified to be $Al_{0.16}Si_{1.84}N_{1.84}O_{1.16}$. Then, the material was molded into pellet similarly to Example 1 so that an $Al_{0.16}Si_{1.84}N_{1.84}O_{1.16}$ electrode was manufactured.

Example 5

Amorphous $SiO_2$ (having an average particle size of about 10 μm) and Si (having an average particle size of about 1 μm) which were regents and MgO powder were weighed in such a manner that the molar ratio was made to be 10:30:1. Then, mixture and heat treatment were performed similarly to Example 1. The obtained compound was pulverized in an agate mortar, and then X-ray diffraction was performed. As a result, a value d and relative strength similar to those of $Si_2N_2O$ were obtained. Moreover, other peak was not observed in the diffraction. Similarly to Al in the compound according to Example 3, Mg was substituted for Si and the quantity of the substituted Mg was small. Therefore, it can be considered that the peak in the diffraction similar to that of the $Si_2N_2O$ can be obtained. Then, the material was molded into pellet similarly to Example 1 so that $Si_2N_2O$:Mg electrode was manufactured.

Example 6

Amorphous $SiO_2$ (having an average particle size of about 10 μm) and Si (having an average particle size of about 1 μm) which were regents and KOH were weighed in such a manner that the molar ratio was made to be 10:30:1. Then, amorphous $SiO_2$ and Si were mixed in a agate mortar, and then mixed with KOH dissolved in pure water. Then, heat treatment was performed similarly to Example 1. The obtained compound was pulverized in an agate mortar, and then X-ray diffraction was performed. As a result, a value d and relative strength similar to those of $Si_2N_2O$ were obtained. Moreover, other peak was not observed in the diffraction. Similarly to Al in the compound according to Example 3, K was substituted for Si and the quantity of the substituted K was small. Therefore, it can be considered that the peak in the diffraction similar to that of the $Si_2N_2O$ can be obtained. Then, the material was molded into pellet similarly to Example 1 so that $Si_2N_2O$:K electrode was manufactured.

Example 7

Amorphous $SiO_2$ (having an average particle size of about 10 μm) and Si (having an average particle size of about 1 μm) which were regents and CaO powder were weighed in such a manner that the molar ratio was made to be 10:30:1. Then, mixing and heat treatment were performed similarly to Example 1. The obtained compound was pulverized in an agate mortar, and then X-ray diffraction was performed. As a result, a value d and relative strength similar to those of $Si_2N_2O$ were obtained. Moreover, other peak was not observed in the diffraction. Similarly to Al in the compound according to Example 3, Ca was substituted for Si and the quantity of the substituted K was small. Therefore, it can be considered that the peak in the diffraction similar to that of the $Si_2N_2O$ can be obtained. Then, the material was molded into pellet similarly to Example 1 so that $Si_2N_2O$:Ca electrode was manufactured.

Example 8

Amorphous $SiO_2$ (having an average particle size of about 10 μm) and Si (having an average particle size of about 1 μm) which were regents and NaOH were weighed in such a manner that the molar ratio was made to be 10:30:1. Then, amorphous $SiO_2$ and Si were mixed in an agate mortar, and then mixed with NaOH dissolved in pure water. Then, heat treatment was performed similarly to Example 1. The obtained compound was pulverized in an agate mortar, and then X-ray diffraction was performed. As a result, a value d and relative strength similar to those of $Si_2N_2O$ were obtained. Moreover, other peak was not observed in the diffraction. Similarly to Al in the compound according to Example 3, K was substituted for Si and the quantity of the substituted K was small. Therefore, it can be considered that the peak in the diffraction similar to that of the $Si_2N_2O$ can be obtained. Then, the material was molded into pellet similarly to Example 1 so that $Si_2N_2O$:Na electrode was manufactured.

Results of evaluation of the characteristics similar to that according to Example 1 are shown in Table 3.

TABLE 3

|  | Discharged Capacity [mAh/g] | Charging/ Discharging Efficiency [%] |
| --- | --- | --- |
| Example 3 | 1003 | 79 |
| Example 4 | 1133 | 79 |
| Example 5 | 1147 | 81 |
| Example 6 | 1060 | 73 |
| Example 7 | 1254 | 67 |
| Example 8 | 1091 | 75 |

As can be understood from the results shown in Table 3, the electrodes according to Examples 3 to 8 incorporate the negative electrodes each having a great capacity. Therefore, the electrodes according to Examples 3 to 8 have excellent performance for doping lithium and de-doping lithium. Moreover, each of the negative electrode of the foregoing electrodes has a capacity larger than that realized by the conventional material for the negative electrode.

Note that the composition ratio of at least any one of silicon, germanium and tin, nitrogen and oxygen according to the present invention is not required to precisely be 2:2:1. If the ratios of the elements satisfy ranges 1.4 to 2.1, 1.4 to 2.1 and 0.9 to 1.6, the effect of the present invention can be obtained.

As can be understood from the above-mentioned description, according to the present invention, a material for the negative electrode having excellent performance for doping lithium and de-doping lithium can be obtained. Thus, the negative electrode is able to have a great capacity. When the negative electrode is combined with an appropriate positive electrode, a nonaqueous-electrolyte secondary battery having a large capacity can be obtained.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A material for a negative electrode comprising:

a compound containing tin; nitrogen; and oxygen.

2. A material for a negative electrode according to claim 1, wherein said compound is $Sn_2N_2O$.

3. A material for a negative electrode according to claim 1, wherein said compound contains at least any one of elements selected from a group consisting of lithium, sodium, potassium, magnesium, calcium and aluminum.

4. A nonaqueous-electrolyte secondary battery comprising:

a negative electrode comprising a compound containing at least any one of silicon, germanium and tin; nitrogen; and oxygen; a positive electrode; and nonaqueous electrolyte.

5. A nonaqueous-electrolyte secondary battery according to claim 4, wherein said compound containing at least any one of silicon, germanium and tin, nitrogen, and oxygen is expressed by general formula MxNyOz (where M is an element selected from a group consisting of Si, Ge and Sn, x, y and z satisfy 1.4<x<2.1, 1.4<y<2.1 and 0.9<z<1.6, respectively).

6. A nonaqueous-electrolyte secondary battery according to claim 4, wherein said compound containing at least any one of silicon, germanium and tin, nitrogen, and oxygen is $Si_2N_2O$.

7. A nonaqueous-electrolyte secondary battery according to claim 4, wherein said compound containing at least any one of silicon, germanium and tin, nitrogen, and oxygen is $Ge_2N_2O$.

8. A nonaqueous-electrolyte secondary battery according to claim 4, wherein said compound containing at least any one of silicon, germanium and tin, nitrogen, and oxygen is $Sn_2N_2O$.

9. A nonaqueous-electrolyte secondary battery according to claim 4, wherein said compound containing at least any one of silicon, germanium and tin, nitrogen, and oxygen contains at least any one of elements selected from a group consisting of lithium, sodium, potassium, magnesium, calcium and aluminum.

10. A nonaqueous-electrolyte secondary battery according to claim 4, wherein said negative electrode has a conductive material composed of at least one material selected from a group consisting of a carbonaceous material, metal powder and conductive polymer.

11. A material for a negative electrode according to claim 1, wherein the component is expressed by a general formula $Sn_xN_yO_z$, where x, y, z satisfy 1.4<x<2.1, 1.4<y<2.1 and 0.9<z<1.6.

* * * * *